(12) United States Patent
Hepkin et al.

(10) Patent No.: US 8,468,289 B2
(45) Date of Patent: Jun. 18, 2013

(54) DYNAMIC MEMORY AFFINITY REALLOCATION AFTER PARTITION MIGRATION

(75) Inventors: David Alan Hepkin, Austin, TX (US); Peter Joseph Heyrman, Rochester, MN (US); Bret Ronald Olszewski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 12/910,234

(22) Filed: Oct. 22, 2010

(65) Prior Publication Data

US 2012/0102258 A1    Apr. 26, 2012

(51) Int. Cl.
*G06F 12/08*    (2006.01)

(52) U.S. Cl.
USPC .................................................. 711/6; 718/1

(58) Field of Classification Search
None
See application file for complete search history.

(56) References Cited

U.S. PATENT DOCUMENTS

| | | | |
|---|---|---|---|
| 7,356,679 | B1 | 4/2008 | Le et al. |
| 7,383,405 | B2 | 6/2008 | Vega et al. |
| 2005/0268298 | A1 | 12/2005 | Hunt et al. |
| 2007/0130566 | A1 | 6/2007 | van Rietschote et al. |
| 2008/0127182 | A1 | 5/2008 | Newport et al. |
| 2008/0163203 | A1 | 7/2008 | Anand et al. |

*Primary Examiner* — Kevin Verbrugge
(74) *Attorney, Agent, or Firm* — David A. Mims, Jr.

(57) ABSTRACT

A method of dynamically reallocating memory affinity in a virtual machine after migrating the virtual machine from a source computer system to a destination computer system migrates processor states and resources used by the virtual machine from the source computer system to the destination computer system. The method maps memory of the virtual machine to processor nodes of the destination computer system. The method deletes memory mappings in processor hardware, such as translation lookaside buffers and effective-to-real address tables, for the virtual machine on the destination computer system. The method starts the virtual machine on the destination computer system in virtual real memory mode. A hypervisor running on the destination computer system receives a page fault and virtual address of a page for said virtual machine from a processor of the destination computer system and determines if the page is in local memory of the processor. If the hypervisor determines the page to be in the local memory of the processor, the hypervisor returning a physical address mapping for the page to the processor. If the hypervisor determines the page not to be in the local memory of the processor, the hypervisor moves the page to local memory of the processor and returns a physical address mapping for said page to the processor.

24 Claims, 5 Drawing Sheets

DYNAMIC MEMORY AFFINITY REALLOCATION AFTER PARTITION MIGRATION

BACKGROUND OF THE INVENTION

1. Technical Field

The present invention relates generally to the field of virtual machine management, and more particularly to methods, systems, and computer program products for dynamically reallocating memory affinity in a virtual machine after migrating the virtual machine from a source computer system to a destination computer system, particularly wherein the source and destination computer systems embody non-uniform memory access technology.

2. Description of the Related Art

A current trend in computing is toward virtualization, in which multiple virtual machines or logical partitions run on a single physical system. Each virtual machine includes an operating system image and one or more application programs. A hypervisor provides an interface between the virtual machines and the physical hardware of the system. Each virtual machine sees itself as an independent system isolated from any other virtual machines that may be running on the physical system.

Virtualization provides many benefits. As physical systems become more powerful, many resources are available for use by operating systems and applications. Typically, a physical system has much more resources than any one operating system and set of applications needs. By running multiple virtual machines on a single system, the hardware cost per virtual machine is reduced.

Another benefit provided by virtualization is portability, or the ability to move a virtual machine from a source physical system to a destination system with substantially no interruption of service. An image of the state of the virtual machine is saved on the source system and them moved to and restarted on the destination system. The portability feature allows a virtual machine to be moved in order to perform maintenance on the source system, or to upgrade hardware, or to rebalance load across multiple physical systems.

A trend in hardware is toward multiprocessor systems, wherein a single physical system includes multiple processors. There is also a trend in multiprocessor systems away from symmetric multiprocessing (SMP) systems toward non-uniform memory access (NUMA) systems. In SMP systems, two or more identical processors are connected to a single shared memory. In NUMA systems, the processors are distributed across nodes. Each node includes one or more processors connected memory local to the node. The nodes are interconnected by a network so that processors on one node can access memory on other nodes.

Processors in NUMA systems can access local memory quickly and efficiently. However, when a processor needs to access remote memory on a different node, there is delay, which is known as latency. There are also bandwidth issues over the network that interconnects the nodes. Accordingly, it desirable in most cases that memory pages be located in the local memory of the node that includes the processor that most often uses those pages. The process of locating pages in local memory is known as affinitization.

In order to optimize software's use of memory in a NUMA system, it is typical to provide system topology information. This information describes the relationship between chunks of memory and processors. These relationships can be described even if the processor and memory are virtualized; however, in that case the relationships are only as good as the Hypervisor's ability to maintain good affinity between those resources.

When a virtual machine migrates from one physical machine to another, it is difficult to have a memory and processor topology on the destination system that is exactly the same as on the source system. This difficulty may have profound consequences for software applications that have long-lived processes. Essentially, the efforts of the software which provided optimized mapping of processors to memory on the source system now likely have deoptimized mappings on the destination system. This can create several performance problems on a highly NUMA system.

Consider the case of a mission critical database system where the database processes run for months or years without being stopped. Since the processes are very long lived, the operating system's memory mappings for those processes are difficult to fix. Historically, operating systems have provided schemes to move change mappings of memory for long lived processes when they are load-balanced within a system. However, this requires operating system changes.

SUMMARY OF THE INVENTION

Embodiments of the present invention provide methods, systems, and computer program products for dynamically reallocating memory affinity in a virtual machine after migrating the virtual machine from a source computer system to a destination computer system. Embodiments of the method migrate processor states and resources used by the virtual machine from the source computer system to the destination computer system. The method maps memory of the virtual machine to processor nodes of the destination computer system. The method deletes memory mappings in processor hardware, such as translation lookaside buffers and effective-to-real address tables, for the virtual machine on the destination computer system. The method starts the virtual machine on the destination computer system in virtual real memory mode.

A hypervisor running on the destination computer system receives a page fault and virtual address of a page for said virtual machine from a processor of the destination computer system and determines if the page is in local memory of the processor. If the hypervisor determines the page to be in the local memory of the processor, the hypervisor returns a physical address mapping for the page to the processor. If the hypervisor determines the page not to be in the local memory of the processor, the hypervisor moves the page to local memory of the processor and returns a physical address mapping for the page to the processor. The hypervisor continues to process page faults until affinitization is deemed to complete, at which time the virtual machine exits from virtual real memory mode.

In some embodiments, pages may be designated as affinitized or striped. When the hypervisor receives a page fault and virtual address of a page for the virtual machine from a processor of the destination computer system, the hypervisor determines if the page is designated affinitized. If the hypervisor determines the page not to be designated affinitized, the hypervisor returns a physical address mapping for the page to the processor. If the hypervisor determines that the page is designated affinitized, the hypervisor determines if the page is in local memory of the processor. If the page is in local memory of the processor, the hypervisor returns a physical address mapping for the page to the processor. If the hypervisor determines that the page is designated affinitized and is not in local memory of the processor, the hypervisor moves the page to local memory of the processor and returns a physical address mapping for the page to the processor.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
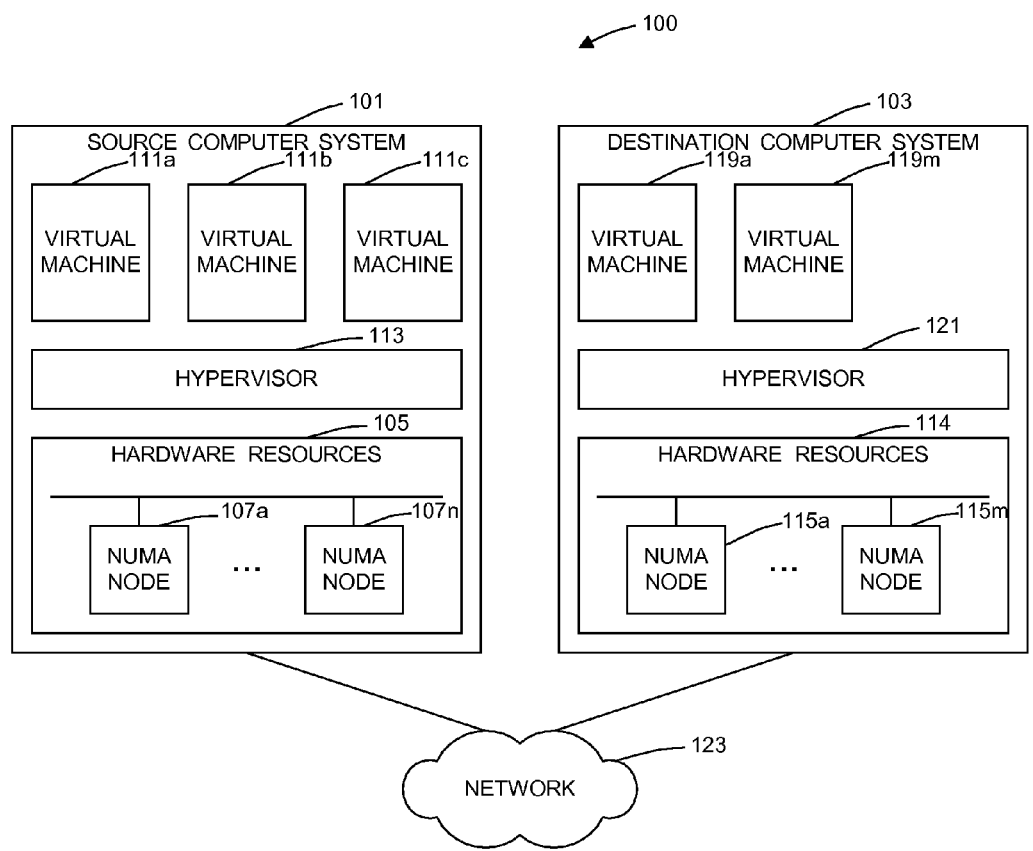
FIG. 1 is a block diagram of an embodiment of a system according to the present invention.

Referring now to drawings, and first to FIG. 1, an embodiment of a system according to the present invention is designated generally by the numeral 100. System 100 includes a source computer system 101 and a destination computer system 103. Source computer system 101 includes a set of hardware resources, indicated at generally at 105. As is known to those skilled in the art, hardware resources include processors, memory, network adapters, and the like.

Source computer system 101 implements non-uniform memory access (NUMA) technology. Accordingly, hardware resources 105 include a plurality of NUMA nodes 107 that are connected to each other by an interconnect network 109. The structure of NUMA nodes will be described in greater detail below with reference to FIG. 2.

Source computer system 101 is capable of virtualization having installed thereon a plurality of virtual machines 111. Virtual machines 111 may be logical partitions (LPARs) or workload partitions (WPARs). As is known to those skilled in the art, an LPAR is a division of the resources 103 of host system 101 into a set of resources so that each set of resources can be operated independently with its own operating system instance and application or applications. An LPAR may include one or more WPARs. A WPAR is a further division of the resources 103 of host system 101 into a set of resources such that each set of resources can be operated independently with its own virtualized operating system image and applications. Inside a WPAR, the application or applications have private execution environments that are isolated from other processes outside the WPAR.

Source computer system 101 includes a hypervisor 113. Hypervisor 113 is a layer that provides the foundation for virtualization of source computer system 101. Hypervisor 113 enables the hardware resources 105 of source computer system 101 to be divided among the multiple virtual machines 111 and it ensures strong isolation between them. Hypervisor 113 is responsible for dispatching the virtual machine 111 workloads across the processors of NUMA nodes 107. Hypervisor 111 also enforces partition security and it can provide inter-partition communication among virtual machines 111 hosted on the source computer system 101.

Destination computer system 103 similarly includes a set of hardware resources, indicated at generally at 113. Destination computer system 103 also implements NUMA technology. Accordingly, hardware resources 114 include a plurality of NUMA nodes 115 that are connected to each other by an interconnect network 117. Although source computer system 101 and destination computer system 103 both implement NUMA technology, their respective processors and memory configurations may be quite different. In fact, they may have entirely different microprocessor types.

Destination computer system 103 may have thereon one or more virtual machines 119. Destination computer system 103 includes a hypervisor 121, which provides the foundation for virtualization of destination computer system 103. Source computer system 101 and destination computer system 103 may be in communication with each other by means of a network, indicated generally at 123.

Figure 2:
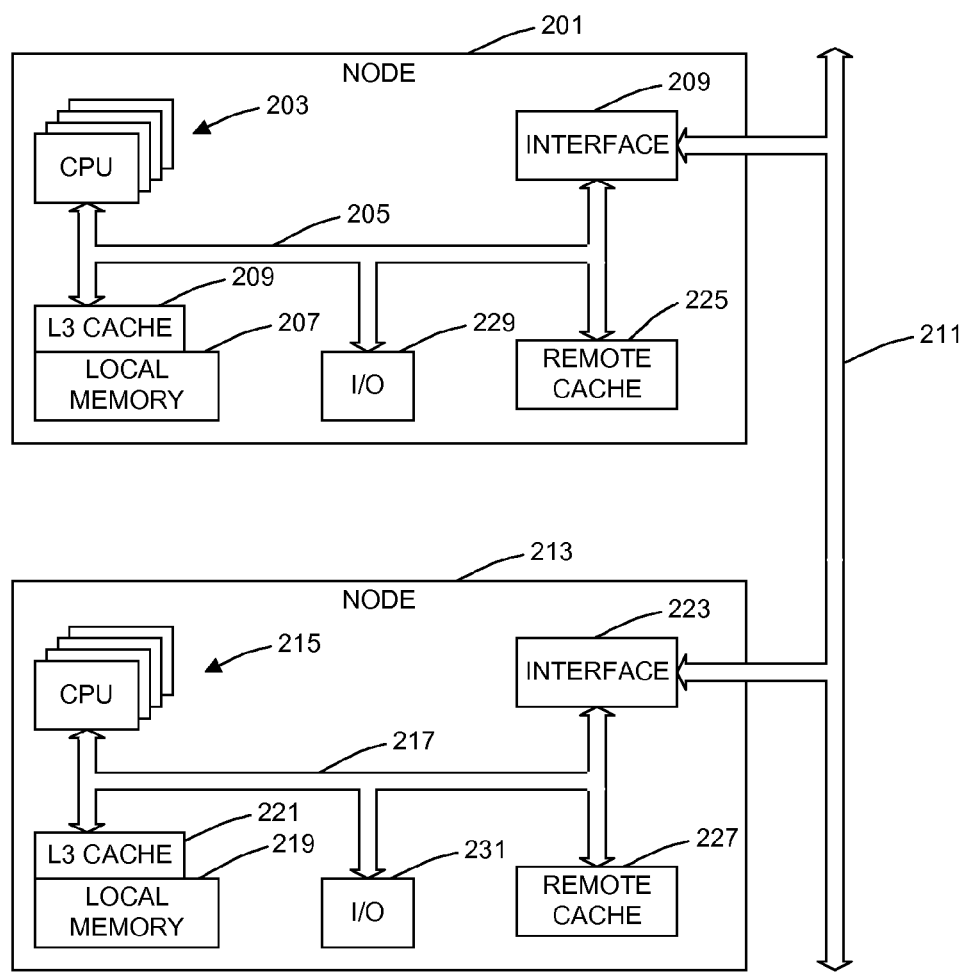
FIG. 2 is a block diagram of an example of a non-uniform memory access system that may implement embodiments according to the present invention.

FIG. 2 illustrates an example of NUMA architecture. A first node 201 includes a plurality of central processing units (CPUs) 203. CPUs 203 are connected to a local memory bus 205. CPUs 203 access a local memory 207 via local bus 207. Node 201 may also include a level-3 (L3) cache memory 209, which is connected to local bus 205. Node 201 includes a router or interface 209 that connects local bus 205 to an interconnect 211, which enables CPUs 203 to access memory pages stored remotely to node 201. A second node 213 similarly includes a plurality of CPUs 215. CPUs 215 are connected to a local memory bus 217, which is connected to local memory 219 and L3 cache memory 221. Node 213 includes an interface 223 that connects local bus 217 to interconnect 211. Memory pages that are stored local memory 207 of node 201 are affinitized to CPUs 203. Similarly, memory pages that are stored in local memory 201 of node 213 are affinitized to CPUs 215. Nodes 201 and 213 may include remote caches 225 and 227, respectively, which cache memory contents that have been obtained from other NUMA nodes via interconnect 211. Nodes 201 and 213 also include I/O indicated generally at 229 and 231, respectively.

Figure 3:
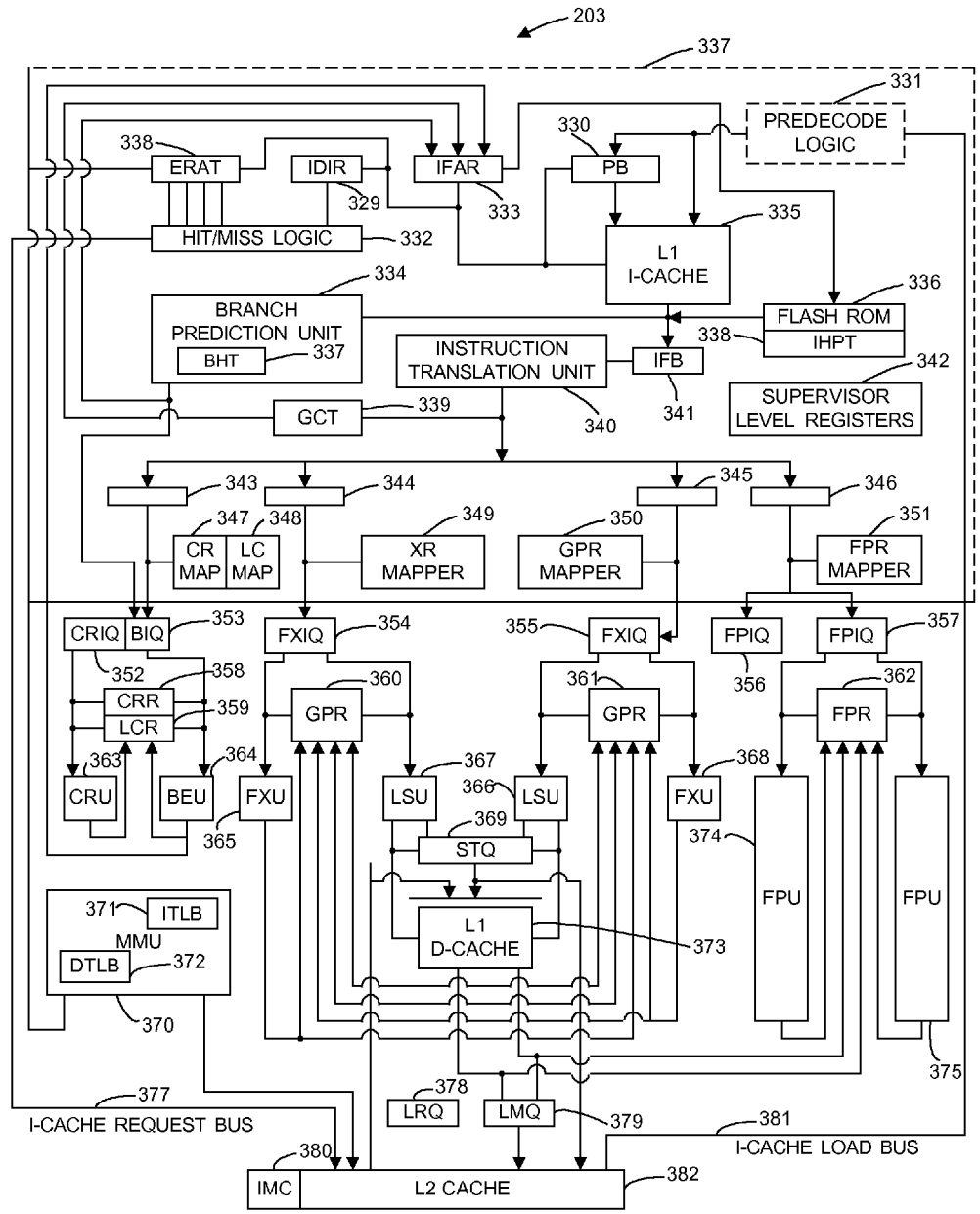
FIG. 3 is a block diagram of an example of a processing unit that may implement embodiments according to the present invention.

FIG. 3 illustrates an example of a processing unit, such as a CPU 203 or 215 of FIG. 2. Processing unit 203 includes an on-chip multi-level cache hierarchy including a unified level-two (L2) cache 382 and bifurcated level-one (L1) instruction (I) and data (D) caches 335 and 373, respectively. As is well-known to those skilled in the art, caches 382, 335 and 373 provide low latency access to cache lines corresponding to memory locations in system memories.

Instructions are fetched for processing from L1 I-cache 335 in response to an effective address (EA) residing in instruction fetch address register (IFAR) 333. During each cycle, a new instruction fetch address may be loaded into IFAR 333 from one of three sources: branch prediction unit (BPU) 334, which provides speculative target path and sequential addresses resulting from the prediction of conditional branch instructions, global completion table (GCT) 339, which provides flush and interrupt addresses, and branch execution unit (BEU) 364, which provides non-speculative addresses resulting from the resolution of predicted conditional branch instructions.

An effective address (EA), such as the instruction fetch address within IFAR 333, is the address of data or an instruction generated by a processor. The EA specifies a segment register and offset information within the segment. To access data (including instructions) in memory, the EA is converted to a real address (RA), through one or more levels of translation, associated with the physical location where the data or instructions are stored.

Within processing unit 203, effective-to-real address translation is performed by memory management units (MMUs) and associated address translation facilities. Preferably, a separate MMU is provided for instruction accesses and data accesses. In FIG. 3, a single MMU 370 is illustrated, for purposes of clarity, showing connections only to instruction sequencing unit, indicated generally at 337. However, it is understood by those skilled in the art that MMU 370 also preferably includes connections (not shown) to load/store units (LSUs) 366 and 367 and other components necessary for managing memory accesses. MMU 370 includes data translation lookaside buffer (DTLB) 372 and instruction translation lookaside buffer (ITLB) 371. Each TLB contains recently referenced page table entries, which are accessed to translate EAs to RAs for data (DTLB 372) or instructions (ITLB 371). Recently referenced EA-to-RA translations from ITLB 371 are cached in effective-to-real address table (ERAT) 328.

If hit/miss logic 332 determines, after translation of the EA contained in IFAR 333 by ERAT 328 and lookup of the real address (RA) in I-cache directory (IDIR) 329, that the cache line of instructions corresponding to the EA in IFAR 333 does not reside in L1 I-cache 335, then hit/miss logic 332 provides the RA to L2 cache 382 as a request address via I-cache request bus 377. Such request addresses may also be generated by prefetch logic within L2 cache 382 based upon recent access patterns. In response to a request address, L2 cache 382 outputs a cache line of instructions, which are loaded into prefetch buffer (PB) 330 and L1 I-cache 335 via I-cache reload bus 381, possibly after passing through optional predecode logic 331.

Once the cache line specified by the EA in IFAR 333 resides in L1 I-cache 335, L1 I-cache 335 outputs the cache line to both branch prediction unit (BPU) 334 and to instruction fetch buffer (IFB) 341. BPU 334 scans the cache line of instructions for branch instructions and predicts the outcome of conditional branch instructions, if any. Following a branch prediction, BPU 334 furnishes a speculative instruction fetch address to IFAR 333, as discussed above, and passes the prediction to branch instruction queue (BIQ) 353 so that the accuracy of the prediction can be determined when the conditional branch instruction is subsequently resolved by branch execution unit (BEU) 364.

IFB 341 temporarily buffers the cache line of instructions received from L1 I-cache 335 until the cache line of instructions can be translated by instruction translation unit (ITU) 340. In the illustrated embodiment of processing unit 201, ITU 340 translates instructions from user instruction set architecture (UISA) instructions into a possibly different number of internal ISA (IISA) instructions that are directly executable by the execution units of processing unit 201. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table (GCT) 339 to an instruction group, the members of which are permitted to be dispatched and executed out-of-order with respect to one another. Global completion table 339 tracks each instruction group for which execution has yet to be completed by at least one associated EA, which is preferably the EA of the oldest instruction in the instruction group.

Following UISA-to-IISA instruction translation, instructions are dispatched to one of latches 343, 344, 345 and 346, possibly out-of-order, based upon instruction type. That is, branch instructions and other condition register (CR) modifying instructions are dispatched to latch 343, fixed-point and load-store instructions are dispatched to either of latches 344 and 345, and floating-point instructions are dispatched to latch 346. Each instruction requiring a rename register for temporarily storing execution results is then assigned one or more rename registers by the appropriate one of CR mapper 347, link and count (LC) register mapper 348, exception register (XR) mapper 349, general-purpose register (GPR) mapper 350, and floating-point register (FPR) mapper 351.

The dispatched instructions are then temporarily placed in an appropriate one of CR issue queue (CRIQ) 352, branch issue queue (BIQ) 353, fixed-point issue queues (FXIQs) 354 and 355, and floating-point issue queues (FPIQs) 356 and 357. From issue queues 352, 353, 354, 355, 356 and 357, instructions can be issued opportunistically to the execution units of processing unit 201 for execution as long as data dependencies and antidependencies are observed. The instructions, however, are maintained in issue queues 352-357 until execution of the instructions is complete and the result data, if any, are written back, in case any of the instructions needs to be reissued.

As illustrated, the execution units of processing unit 203 include a CR unit (CRU) 363 for executing CR-modifying instructions, a branch execution unit (BEU) 364 for executing branch instructions, two fixed-point units (FXUs) 365 and 368 for executing fixed-point instructions, two load-store units (LSUs) 366 and 367 for executing load and store instructions, and two floating-point units (FPUs) 374 and 375 for executing floating-point instructions. Each of execution units 363-375 is preferably implemented as an execution pipeline having a number of pipeline stages.

During execution within one of execution units 363-375, an instruction receives operands, if any, from one or more architected and/or rename registers within a register file coupled to the execution unit. When executing CR-modifying or CR-dependent instructions, CRU 363 and BEU 364 access the CR register file 358, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) register file 359 contains a count register (CTR), a link register (LR) and rename registers of each, by which BEU 364 may also resolve conditional branches to obtain a path address. General-purpose register files (GPRs) 360 and 361, which are synchronized, duplicate register files, store fixed-point and integer values accessed and produced by FXUs 365 and 368 and LSUs 366 and 367. Floating-point register file (FPR) 362, which like GPRs 360 and 361 may also be implemented as duplicate sets of synchronized registers, contains floating-point values that result from the execution of floating-point instructions by FPUs 374 and 375 and floating-point load instructions by LSUs 366 and 367.

After an execution unit finishes execution of an instruction, the execution notifies GCT 339, which schedules completion of instructions in program order. To complete an instruction executed by one of CRU 363, FXUs 365 and 368 or FPUs 374 and 375, GCT 339 signals the execution unit, which writes back the result data, if any, from the assigned rename register(s) to one or more architected registers within the appropriate register file. The instruction is then removed from the issue queue, and once all instructions within its instruction group have completed, is removed from GCT 339. Other types of instructions, however, are completed differently.

When BEU 364 resolves a conditional branch instruction and determines the path address of the execution path that should be taken, the path address is compared against the speculative path address predicted by BPU 334. If the path addresses match, no further processing is required. If, however, the calculated path address does not match the predicted path address, BEU 364 supplies the correct path address to IFAR 333. In either event, the branch instruction can then be removed from BIQ 353, and when all other instructions within the same instruction group have completed, from GCT 339.

Following execution of a load instruction, the effective address computed by executing the load instruction is translated to a real address by a data ERAT (not illustrated) and then provided to L1 D-cache 373 as a request address. At this point, the load instruction is removed from FXIQ 354 or 355 and placed in load reorder queue (LRQ) 378 until the indicated load is performed. If the request address misses in L1 D-cache 373, the request address is placed in load miss queue (LMQ) 379, from which the requested data is retrieved from L2 cache 382 (which is under the control of an Instruction Memory Controller (IMC) 380), and failing that, from another processing unit 201 or from system memory 216 (shown in FIG. 2A). LRQ 378 snoops exclusive access requests (e.g., read-with-intent-to-modify), flushes or kills on an interconnect fabric against loads in flight, and if a hit occurs, cancels and reissues the load instruction. Store instructions are similarly completed utilizing a store queue (STQ) 369 into which effective addresses for stores are loaded following execution of the store instructions. From STQ 369, data can be stored into either or both of L1 D-cache 373 and L2 cache 382.

The states of a processor includes stored data, instructions and hardware states at a particular time, and are herein defined as either being "hard" or "soft." The "hard" state is defined as the information within a processor that is architecturally required for a processor to execute a process from its present point in the process. The "soft" state, by contrast, is defined as information within a processor that would improve efficiency of execution of a process, but is not required to achieve an architecturally correct result. In processing unit 203, the hard state includes the contents of user-level registers, such as CRR 358, LCR 359, GPRs 360 and 361, FPR 362, as well as supervisor level registers 342. The soft state of processing unit 201 includes both "performance-critical" information, such as the contents of L-1 I-cache 335, L-1 D-cache 373, address translation information such as DTLB 372 and ITLB 371, and less critical information, such as BHT 337 and all or part of the content of L2 cache 382.

The hard architectural state is stored to system memory through the load/store unit of the processor core, which blocks execution of the interrupt handler or another process for a number of processor clock cycles. Alternatively, upon receipt of an interrupt, processing unit 201 suspends execution of a currently executing process, such that the hard architectural state stored in hard state registers is then copied directly to shadow register. The shadow copy of the hard architectural state, which is preferably non-executable when viewed by the processing unit 201, is then stored to system memory 216. The shadow copy of the hard architectural state is preferably stored in a special memory area within system memory 216 that is reserved for hard architectural states.

Saving soft states differs from saving hard states. When an interrupt handler is executed by a conventional processor, the soft state of the interrupted process is typically polluted. That is, execution of the interrupt handler software populates the processor's caches, address translation facilities, and history tables with data (including instructions) that are used by the interrupt handler. Thus, when the interrupted process resumes after the interrupt is handled, the process will experience increased instruction and data cache misses, increased translation misses, and increased branch mispredictions. Such misses and mispredictions severely degrade process performance until the information related to interrupt handling is purged from the processor and the caches and other components storing the process' soft state are repopulated with information relating to the process. Therefore, at least a portion of a process' soft state is saved and restored in order to reduce the performance penalty associated with interrupt handling. For example, the entire contents of L1 I-cache 335 and L1 D-cache 373 may be saved to a dedicated region of system memory 216. Likewise, contents of BHT 337, ITLB 371 and DTLB 372, ERAT 328, and L2 cache 382 may be saved to system memory 216.

Because L2 cache 382 may be quite large (e.g., several megabytes in size), storing all of L2 cache 382 may be prohibitive in terms of both its footprint in system memory and the time/bandwidth required to transfer the data. Therefore, in a preferred embodiment, only a subset (e.g., two) of the most recently used (MRU) sets are saved within each congruence class.

Thus, soft states may be streamed out while the interrupt handler routines (or next process) are being executed. This asynchronous operation (independent of execution of the interrupt handlers) may result in an intermingling of soft states (those of the interrupted process and those of the interrupt handler). Nonetheless, such intermingling of data is acceptable because precise preservation of the soft state is not required for architected correctness and because improved performance is achieved due to the shorter delay in executing the interrupt handler.

In the description above, register files of processing unit 203 such as GPR 361, FPR 362, CRR 358 and LCR 359 are generally defined as "user-level registers," in that these registers can be accessed by all software with either user or supervisor privileges. Supervisor level registers 342 include those registers that are used typically by an operating system, typically in the operating system kernel, for such operations as memory management, configuration and exception handling. As such, access to supervisor level registers 342 is generally restricted to only a few processes with sufficient access permission (i.e., supervisor level processes).

Virtual machines may be dynamically relocated from one computer system to another. Briefly, in order to relocate a virtual machine from a source computer system to a destination computer system, the relocating virtual machine is check-pointed on the source computer system. The relocating virtual machine is restarted on the destination computer system in the same state as it was check-pointed on the source computer system.

Returning to FIG. 1, source computer system 101 and destination computer system 103 are interconnected through a network, indicated generally at 123. Network 123 may comprise a local area network (LAN), a wide area network (WAN) or a system of interconnected networks. When it is desired to relocate virtual machine, for example virtual machine 111c, from source computer system 101 to destination computer system 103, as will be explained in detail hereinafter, the processor states and memory contents associated with virtual machine 111c may be migrated to destination computer system 103 over network 123.

Figure 4:
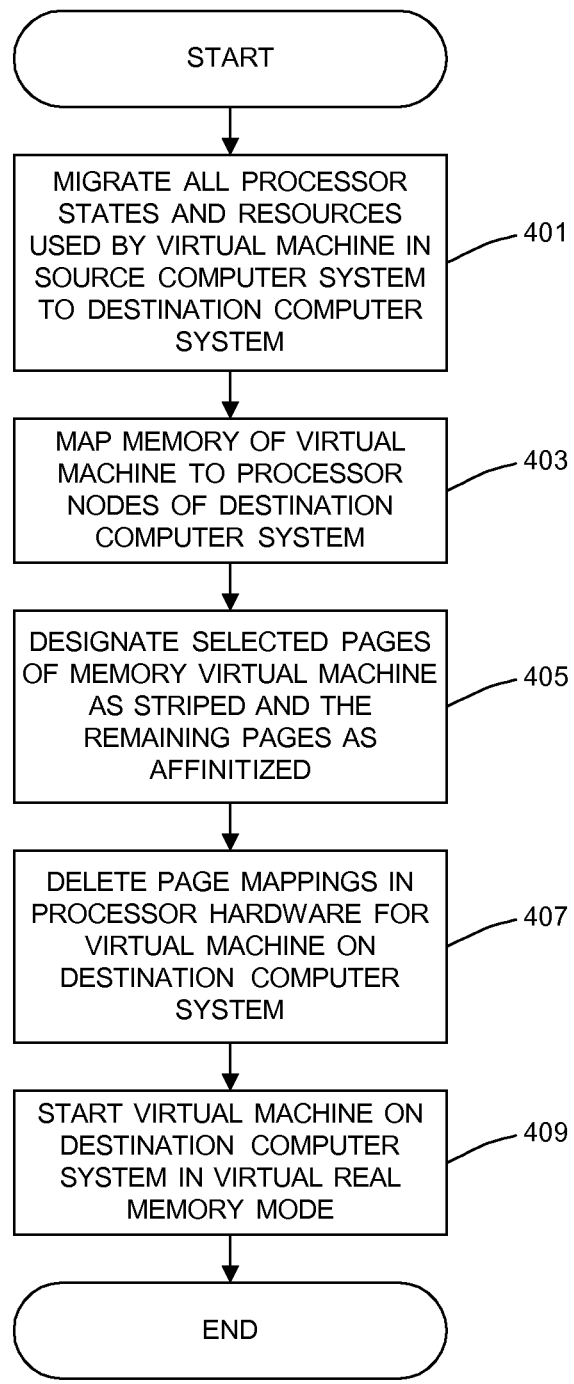
FIG. 4 is a high-level flowchart of an embodiment of migration of a virtual machine to a destination system according to the present invention; and, FIG. 5 is a high-level flowchart of an embodiment of affinitization processing according to the present invention.

FIG. 4 is a high-level flowchart of an embodiment of virtual machine migration according to the present invention. Initially, the states for the migrating virtual machine on the source computer system are saved. The migration process migrates all processor states and resources used by the virtual machine in the source computer system to the destination computer system, as indicated at block 401. The process makes an initial mapping of the memory of the virtual machine to processor nodes of the destination computer system, as indicated at block 403. The migration process may attempt to make the initial mapping on the destination computer system as close as possible to the mapping on the source machine or it may simply map the memory to processor nodes on the destination computer system. In either event, the initial mapping on the destination computer system will likely not be the same as the mapping on the source system, based on resource availability on the destination system. In particular, the processors and memory available on the destination system may be quite different from those on the source system. In alternative embodiments, the migration process may leave memory mapped on the source computer system until a processor on the destination computer system touches a particular page of memory, at which time the migration process maps the memory page to the processor that touches the page.

Certain memory pages on the source computer system may be touched almost exclusively by a particular processor or processor node while other memory pages may be touched by several processors or processor nodes. Pages that are touched exclusively by a particular processor or node are affinitized on the source computer system to the particular processor or node. Pages that may be touched by processors on different nodes may be stripped across the memory of the source computer system. Accordingly, the migration process may designate selected pages of memory associated with the relocating virtual machine a striped and the remaining pages as affinitized, as indicated at block 405. The selection of affinitized or striped may be determined by retained state associating with the initial mapping or heuristics. For some kinds of memory allocation, such as shared memory, there is not strong locality, so striping of some pages over the available memory domains may be desirable. However, affinity is maintained for other memory pages.

After mapping the memory of the relocating virtual machine to the processor nodes of the destination computer system, the process deletes the page mappings in processor hardware, such as translation lookaside buffers (TLBs) and effective-to-real address table (ERATs), for the virtual machine on the destination computer system, as indicated at block 407. Then, the process starts the relocating virtual machine on the destination computer system in virtual real memory mode, which means that the hypervisor takes control of mapping virtual memory to physical addresses.

Figure 5:
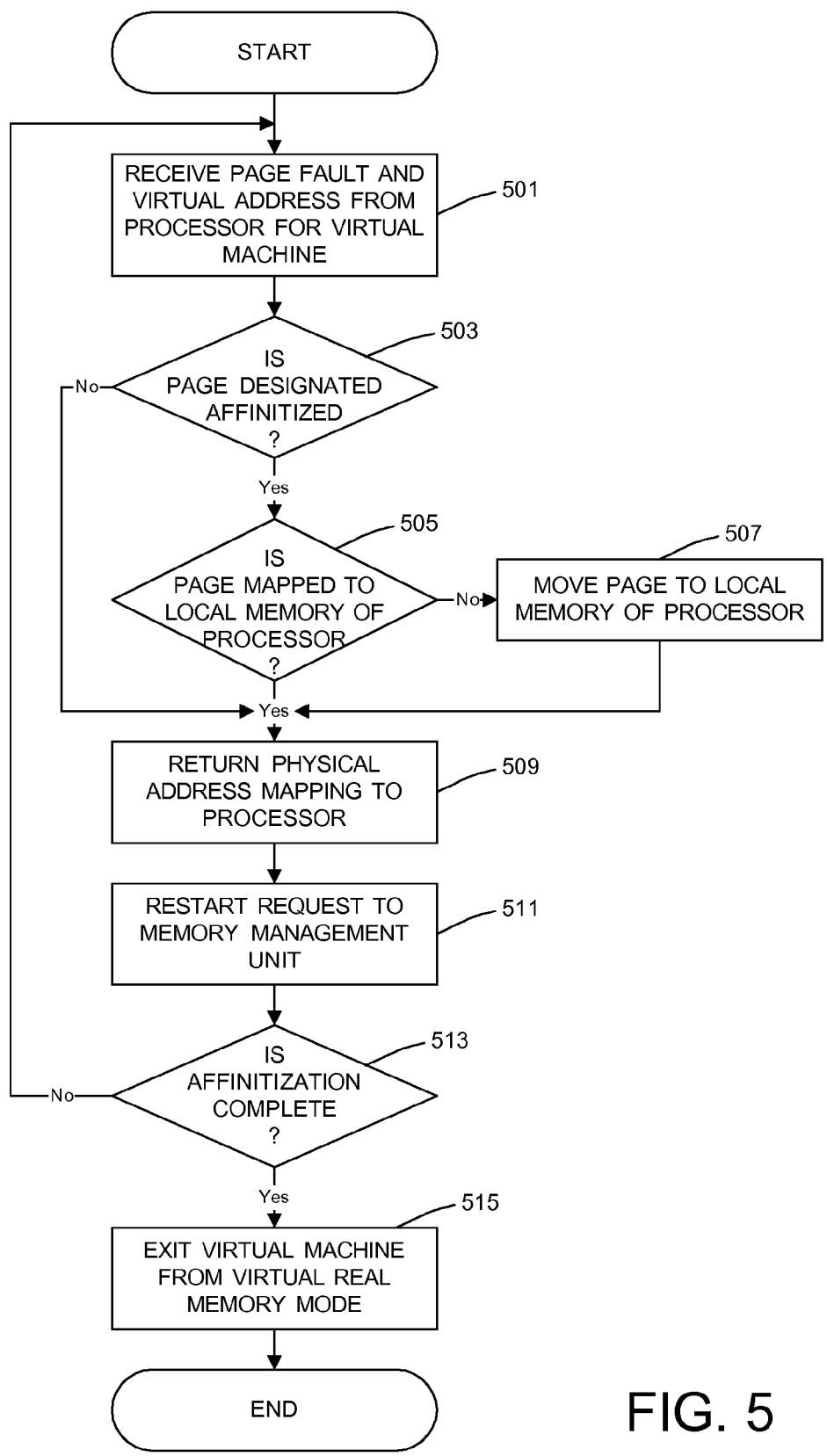

FIG. 5 is flowchart of an embodiment of hypervisor processing during reaffinitization according to the present invention. Since initial page mappings in hardware (TLB and/or ERAT) do not exist, each touch of a page will initially case a page fault. The hypervisor receives a page fault with a virtual address from the virtual machine, as indicated at block 501. The hypervisor determines, at decision block 503, if the page is designated affinitized. If not, the hypervisor returns a physical address mapping to the processor, at block 509, and instructs the processor's memory management unit to restart the request, at block 511. If, as determined at decision block 503, the page is designated affinitized, the hypervisor determines, at decision block 505, if the page is local memory of the processor. If so, processing proceeds to block 509, as described above. If the page is not in local memory of the processor, the hypervisor moves the page to local memory of the processor. In embodiments in which all of the memory for the virtual machine is initially mapped to processor nodes of the destination computer system, this step may require the hypervisor to borrow some extra memory on the destination computer system. Then, the hypervisor returns the physical address mapping to the processor, at block 509, and instructs the processor's memory management unit to restart the request, at block 511. Then, the hypervisor determines, as indicated generally at decision block 513, if affinitization is complete. Affinitization may be deemed to be complete after the virtual machine has been running for a predetermined time on the destination computer system or after predetermined amount or fraction of memory has been touched or reaffinitized. If affinitization is not complete, hypervisor processing returns to block 501. If affinitization is complete, the hypervisor exits the virtual machine from virtual real memory mode, as indicated at block 515, and hypervisor affinitization processing ends. At the completion of processing according to FIG. 5, allocated memory will be reaffinitized to processors that initially touch the memory. If memory affinity had been operating on the source computer system, it is likely that the processes of the present invention will provide good affinity without operating system intervention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium or media having computer readable program code embodied thereon.

Any combination of one or more computer readable medium or media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions comprising the program code for carrying out aspects of the present invention may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the foregoing flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the foregoing flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A method, which comprises:
migrating processor states and resources used by a virtual machine from a source computer system to a destination computer system;
mapping memory of said virtual machine to processor nodes of said destination computer system;
deleting memory mappings in processor hardware for said virtual machine on said destination computer system; and,
starting said virtual machine on said destination computer system in virtual real memory mode.

2. The method as claimed in claim 1, further comprising:
receiving a page fault and virtual address of a page for said virtual machine from a processor of said destination computer system;
determining if said page is in local memory of said processor.

3. The method as claimed in claim 2, further comprising:
if said page is determined to be in said local memory of said processor, returning a physical address mapping for said page to said processor.

4. The method as claimed in claim 2, further comprising:
if said page is determined not to be in said local memory of said processor, moving said page to local memory of said processor; and, returning a physical address mapping for said page to said processor.

5. The method as claimed in claim 1, further comprising:
receiving a page fault and virtual address of a page for said virtual machine from a processor of said destination computer system;
determining if said page is designated affinitized.

6. The method as claimed in claim 5, further comprising:
if said page is determined not to be designated affinitized, returning a physical address mapping for said page to said processor.

7. The method as claimed in claim 5, further comprising:
if said page is determined to be designated affinitized, determining if said page is in local memory of said processor; and,
if said page is determined to be in local memory of said processor, returning a physical address mapping for said page to said processor.

8. The method as claimed in claim 5, further comprising:
if said page is determined to be designated affinitized, determining if said page is in local memory of said processor;
if said page is determined not to be in local memory of said processor, moving said page to local memory of said processor; and,
returning a physical address mapping for said page to said processor.

9. A system, which comprises:
a computer system, said computer system including a plurality of processor nodes, each said processor node including a plurality of processors coupled to local memory, and an interconnect network interconnecting said processor nodes;
means for migrating processor states and resources used by a virtual machine to said computer system;
means for mapping memory of said virtual machine to said processor nodes of said computer system;
means for deleting memory mappings in processor hardware for said virtual machine on said computer system; and,
means for starting said virtual machine on said destination computer system in virtual real memory mode.

10. The system as claimed in claim 9, further comprising:
means for receiving a page fault and virtual address of a page for said virtual machine from a processor of said destination computer system; and,
means for determining if said page is in local memory of said processor.

11. The system as claimed in claim 10, further comprising:
means for returning a physical address mapping for said page to said processor if said page is determined to be in said local memory of said processor.

12. The system as claimed in claim 10, further comprising:
means for moving said page to local memory of said processor if said page is determined not to be in said local memory of said processor; and,
means for returning a physical address mapping for said page to said processor.

13. The system as claimed in claim 9, further comprising:
means for receiving a page fault and virtual address of a page for said virtual machine from a processor of said destination computer system;
means for determining if said page is designated affinitized.

14. The system as claimed in claim 13, further comprising:
means for returning a physical address mapping for said page to said processor if said page is determined not to be designated affinitized.

15. The system as claimed in claim 13, further comprising:
means for determining if said page is in local memory of said processor if said page is determined to be designated affinitized; and,
means for returning a physical address mapping for said page to said processor if said page is determined to be in local memory of said processor.

16. The system as claimed in claim 13, further comprising:
means for determining if said page is in local memory of said processor if said page is determined to be designated affinitized;
means for moving said page to local memory of said processor if said page is determined not to be in local memory of said processor; and,
means for returning a physical address mapping for said page to said processor.

17. A computer program product in computer readable storage medium, said computer program product comprising:
instructions stored in a computer readable storage medium for migrating processor states and resources used by a virtual machine from a source computer system to a destination computer system;
instructions stored in said computer readable storage medium for mapping memory of said virtual machine to processor nodes of said destination computer system;
instructions stored in said computer readable storage medium for deleting memory mappings in processor hardware for said virtual machine on said destination computer system; and,
instructions stored in said computer readable storage medium for starting said virtual machine on said destination computer system in virtual real memory mode.

18. The computer program product as claimed in claim 17, further comprising:
instructions stored in said computer readable storage medium for receiving a page fault and virtual address of a page for said virtual machine from a processor of said destination computer system;
instructions stored in said computer readable storage medium for determining if said page is in local memory of said processor.

19. The computer program product as claimed in claim 18, further comprising:
instructions stored in said computer readable storage medium for returning a physical address mapping for said page to said processor if said page is determined to be in said local memory of said processor.

20. The computer program product as claimed in claim 18, further comprising:
instructions stored in said computer readable storage medium for moving said page to local memory of said processor if said page is determined not to be in said local memory of said processor; and,
instructions stored in said computer readable storage medium for returning a physical address mapping for said page to said processor.

21. The computer program product as claimed in claim 17, further comprising:
instructions stored in said computer readable storage medium for receiving a page fault and virtual address of a page for said virtual machine from a processor of said destination computer system;

instructions stored in said computer readable storage medium for determining if said page is designated affinitized.

22. The computer program product as claimed in claim 21, further comprising:
   instructions stored in said computer readable storage medium for returning a physical address mapping for said page to said processor if said page is determined not to be designated affinitized.

23. The computer program product as claimed in claim 21, further comprising:
   instructions stored in said computer readable storage medium for determining if said page is in local memory of said processor if said page is determined to be designated affinitized; and,
   instructions stored in said computer readable storage medium for returning a physical address mapping for said page to said processor if said page is determined to be in local memory of said processor.

24. The computer program product as claimed in claim 21, further comprising:
   instructions stored in said computer readable storage medium for determining if said page is in local memory of said processor if said page is determined to be designated affinitized;
   instructions stored in said computer readable storage medium for moving said page to local memory of said processor if said page is determined not to be in local memory of said processor; and,
   instructions stored in said computer readable storage medium for returning a physical address mapping for said page to said processor.

* * * * *